United States Patent
Wang et al.

(10) Patent No.: US 10,386,181 B2
(45) Date of Patent: Aug. 20, 2019

(54) CARTRIDGE AND DETECTION METHOD FOR THE SAME

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jiali Wang, Beijing (CN); Shengguang Sang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 769 days.

(21) Appl. No.: 14/407,132

(22) PCT Filed: Nov. 28, 2013

(86) PCT No.: PCT/CN2013/088040
§ 371 (c)(1),
(2) Date: Dec. 11, 2014

(87) PCT Pub. No.: WO2015/010401
PCT Pub. Date: Jan. 29, 2015

(65) Prior Publication Data
US 2015/0345941 A1 Dec. 3, 2015

(30) Foreign Application Priority Data
Jul. 23, 2013 (CN) .......................... 2013 1 0311641

(51) Int. Cl.
*G01V 8/14* (2006.01)
*B65D 85/38* (2006.01)
(Continued)

(52) U.S. Cl.
CPC ............. *G01B 21/16* (2013.01); *B65D 85/38* (2013.01); *G01V 8/14* (2013.01); *G01B 21/00* (2013.01)

(58) Field of Classification Search
CPC ........... B65D 85/38; G01B 21/16; G01V 8/14
(Continued)

(56) References Cited

U.S. PATENT DOCUMENTS 6,241,334 B1 * 6/2001 Haselby ................. B41J 2/2135
347/19
2002/0070102 A1 * 6/2002 Kawada ............. H05K 13/0061
198/817
(Continued)

FOREIGN PATENT DOCUMENTS

CN 1616319 A 5/2005
CN 201247360 Y 5/2009
(Continued)

OTHER PUBLICATIONS

Search Report issued in International Application No. PCT/CN2013/088040, fourteen (14) pages.
(Continued)

*Primary Examiner* — Eman A Alkafawi
(74) *Attorney, Agent, or Firm* — Nath, Goldberg & Meyer; Joshua B. Goldberg (57) ABSTRACT

The present invention discloses a cartridge and a detection method for the same. The cartridge comprises an outer frame and barriers located inside the outer frame. The cartridge further comprises a detection device. The detection device comprises a sensing device configured to sense the barriers so as to acquire sensed information, and a first information processing device configured to judge whether the positions of the barriers are correct according to the sensed information. For the cartridge provided by the present invention,
(Continued)

whether barriers are located at correct positions and thus whether the loading size of the cartridge is matched with the size of a substrate to be loaded can be effectively detected, so that the damage to the substrate during loading of the substrate is effectively avoided and it is ensured that the substrate can be safely loaded into the cartridge.

12 Claims, 6 Drawing Sheets (51) Int. Cl.
  G01B 21/00 (2006.01)
  G01B 21/16 (2006.01)
(58) Field of Classification Search
  USPC .......................................................... 702/82
  See application file for complete search history.

(56) References Cited

U.S. PATENT DOCUMENTS

| | | | | |
|---|---|---|---|---|
| 2008/0317480 | A1* | 12/2008 | Fukusada | G03G 15/0862 399/12 |
| 2011/0201099 | A1* | 8/2011 | Anderson | G01N 21/05 435/287.2 |
| 2012/0231158 | A1* | 9/2012 | Ueno | C23C 14/50 427/128 |
| 2012/0301615 | A1* | 11/2012 | Honda | C23C 14/541 427/255.5 |

FOREIGN PATENT DOCUMENTS

| | | | |
|---|---|---|---|
| CN | 101620189 | A | 1/2010 |
| CN | 101907577 | A | 12/2010 |
| CN | 102721692 | A | 10/2012 |
| CN | 102967887 | A | 3/2013 |
| CN | 202903138 | U | 4/2013 |
| CN | 103412347 | A | 11/2013 |
| KR | 20110094805 | A | 8/2011 |
| KR | 20130016665 | A | 2/2013 |
| KR | 101279941 | B1 | 7/2013 |

OTHER PUBLICATIONS

1st office action issued in Chinese application No. 201310311641.4 dated Aug. 7, 2015.

Form PCT/ISA/237 (Box No. V) issued in International application No. PCT/CN2013/088040.

* cited by examiner

CARTRIDGE AND DETECTION METHOD FOR THE SAME

This is a National Phase Application filed under 35 U.S.C. 371 as a national stage of PCT/CN2013/088040, filed Nov. 28, 2013, and claims priority benefit from Chinese Application No. 201310311641.4, filed Jul. 23, 2013, the content of each of which is hereby incorporated by reference in its entirety.

FIELD OF THE INVENTION

The present invention relates to the field of display substrate processing, and particularly relates to a cartridge and a detection method for the same.

BACKGROUND OF THE INVENTION

A plurality of working procedures are required for processing of a liquid crystal display substrate. After one working procedure is completed, it is required to convey the substrate to a processing position of the next working procedure via a conveying device. During the conveying process, a manipulator loads the substrate into a conveying box so as to prevent the substrate from being damaged during the conveying process, wherein a cartridge is commonly known as the conveying box in the art.

Figure 1:
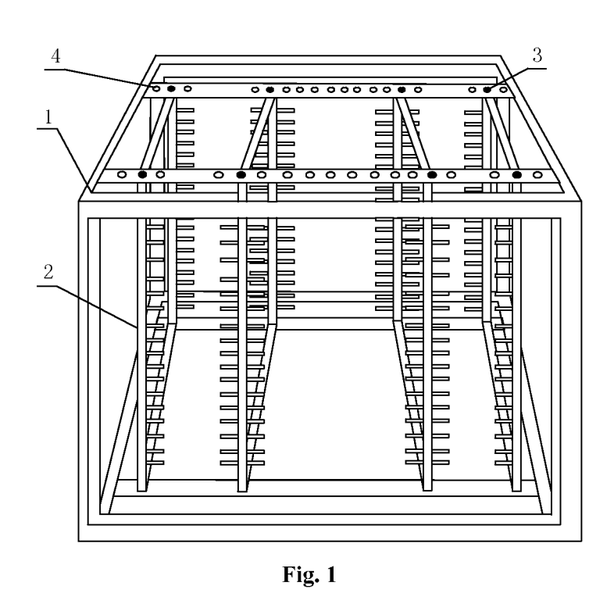
FIG. 1 is a structure diagram of a cartridge in the prior art.
Figure 2:
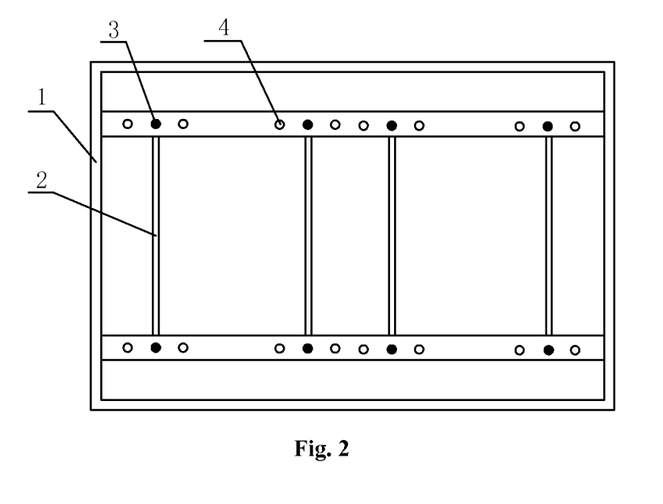
FIG. 2 is a top view of FIG. 1.
Figure 3:
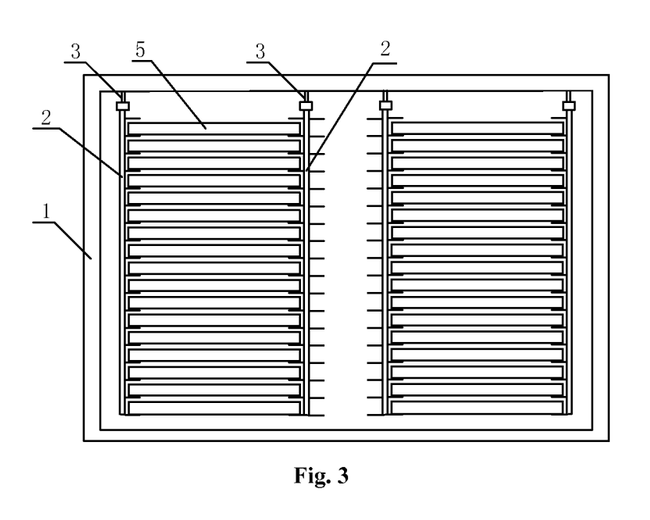
FIG. 3 is a schematic diagram of the cartridge shown in FIG. 1 with small-size substrates being loaded therein.
Figure 4:
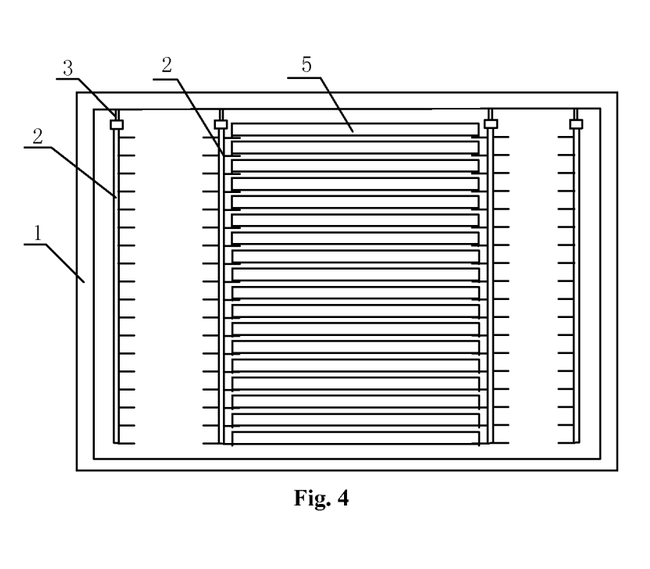
FIG. 4 is a schematic diagram of the cartridge shown in FIG. 1 with large-size substrates being loaded therein.

FIG. 1 is a structure diagram of a cartridge in the prior art, FIG. 2 is a top view of FIG. 1, FIG. 3 is a schematic diagram of the cartridge shown in FIG. 1 with small-size substrates being loaded therein, and FIG. 4 is a schematic diagram of the cartridge shown in FIG. 1 with large-size substrates being loaded therein. As shown in FIGS. 1-4, the cartridge includes an outer frame 1, barriers 2 located inside the outer frame 1, stand columns 3 formed on the barriers 2, and a number of positioning holes 4 provided on the outer frame 1. The stand columns 3 are fixed in the positioning holes 4 to settle the barriers 2, and a loading size of the cartridge is defined by the positions of the barriers 2.

The number of the barriers in the cartridge may be set according to actual requirements. By taking the structure of the cartridge shown in FIG. 1 as example, four barriers 2 are provided in the cartridge. When the cartridge is used for loading small-size substrates, referring to FIG. 3, four barriers 2 are adjusted so that two barriers 2 on the left side define the loading size of the cartridge, and another two barriers 2 on the right side define the loading size of the cartridge as well. That is, the substrates are loaded by using the space between the two barriers 2 on the left side and the space between the other two barriers 2 on the right side.

When the cartridge is used for conveying large-size substrates, referring to FIG. 4, the positions of the four barriers 2 are adjusted so that two barriers 2 in the middle define the loading size of the cartridge, while another two barriers 2 at the left and right ends are not used.

Therefore, by adjusting the positions of barriers, the loading size of the cartridge may be matched with the size of substrates.

However, as the adjustment of the barriers needs to be accomplished manually, the barriers are often not located at correct positions due to human misoperation and other reasons during adjustment. When the barriers are not located at the correct positions, in the process of loading a substrate in the cartridge by a manipulator, it is likely to result in the collision of the substrate with the barriers and thus damage the substrate.

SUMMARY OF THE INVENTION

The present invention provides a cartridge and a detection method for the same, which can effectively detect whether barriers are located at correct positions so that the damage to the substrate during loading of the substrate is effectively avoided.

To achieve the above object, the present invention provides a cartridge, including an outer frame, barriers located inside the outer frame and a detection device, wherein the detection device includes a sensing device and a first information processing device;

the sensing device is configured to sense the barriers so as to acquire sensed information and send the sensed information to the first information processing device; and the first information processing device is configured to judge whether the positions of the barriers are correct according to the sensed information.

Optionally, the sensing device senses the barriers while moving from one end of the cartridge to the other end of the cartridge so as to acquire the sensed information, and sends the sensed information to the first information processing device.

Optionally, the sensing device includes one or more reflective sensors and reflective structures, the reflective sensors are located above the cartridge and configured to emit detection signals while moving from one end of the cartridge to the other end of the cartridge at a predetermined speed, receive reflected signals returned from the reflective structures, generate sensed information according to the reflected signals and send the sensed information to the first information processing device; and the reflective structures are disposed on the tops of the barriers and configured to receive the detection signals and reflect the detection signals to the reflective sensors.

Optionally, the barriers include stand columns; positioning holes are formed on the outer frame; the stand columns are fixed in the positioning holes to settle the barriers; and the reflective structures are disposed on the tops of the stand columns, respectively.

Optionally, the reflective sensors and the reflective structures are in a line alone the moving direction of the reflective sensors.

Optionally, the detection device further includes a driving device, a suspension beam and two guide rails, the two guide rails being located above the cartridge and disposed in parallel with each other, the suspension beam being provided across and perpendicular to the two guide rails, the reflective sensors being disposed on the suspension beam; and the driving device being configured to drive the suspension beam to move from one end of the cartridge to the other end of the cartridge along the guide rails at a predetermined speed.

Optionally, there are a plurality of reflective sensors, and the number of the reflective structures on each barrier is equal to that of the plurality of reflective sensors.

Optionally, the first information processing device includes:

a first judgment module, configured to judge whether a predetermined amount of the sensed information is received at each of predetermined time points;

an accumulation module, configured to add 1 to an accumulated numerical value once the first judgment module judges that the predetermined amount of the sensed information is received at a predetermined time point; and a second judgment module, configured to judge whether the accumulated numerical value is equal to a preset value for the barriers after the sensing device moving to the other end of the cartridge from one end of the cartridge; if the accumulated numerical value is judged to be equal to the preset value for the barriers, it will determine that the positions of the barriers are correct; and if the accumulated numerical value is judged to be not equal to the preset value for the barriers, it will determine that the positions of the barriers are not correct.

Preferably, the first information processing device includes a first judgment module, which is configured to judge whether the sensed information is received at a predetermined time point, and send a notification indicating that the corresponding barriers are not located at correct positions when it is judged that no sensed information is received at the predetermined time point.

Optionally, the detection device further includes:

a second information processing device, configured to compare a predetermined loading size of the cartridge with the size of the substrate; if the result of the comparison shows that the predetermined loading size of the cartridge is matched with the size of the substrate, the sensing device will be activated; if the result of the comparison shows that the predetermined loading size of the cartridge is not matched with the size of the substrate, the loading size of the cartridge will be changed and then the sensing device will be activated.

To achieve the above object, the present invention further provides a detection method for a cartridge, wherein the cartridge includes an outer frame, barriers located inside the outer frame and a detection device, wherein the detection device includes a sensing device and a first information processing device. The detection method is based on the usage of the cartridge and includes:

a sensing step: sensing the barriers by the sensing device to acquire sensed information; and a position judgment step: judging, by the first information processing device, whether the positions of the barriers are correct based on the sensed information.

Optionally, the detection device further includes a second information processing device, and before the sensing step, the detection method further includes:

a comparison step: comparing a predetermined loading size of the cartridge with the size of a substrate by the second information processing device, wherein if the result of the comparison made by the second information processing device shows that the predetermined loading size of the cartridge is matched with the size of the substrate, the sensing step is performed; and if the result of the comparison made by the second information processing device shows that the predetermined loading size of the cartridge is not matched with the size of the substrate, the sensing step is performed after the loading size of the cartridge is adjusted.

Optionally, the sensing step includes:

sensing the barriers by the sensing device while it is moving from one end of the cartridge to the other end of the cartridge so as to acquire the sensed information; and sending the sensed information to the first information processing device by the sending device.

Optionally, the first information processing device includes a first judgment module, an accumulation module and a second judgment module; the position judgment step includes:

a time point judgment step: judging, by the first judgment module, whether a predetermined amount of the sensed information is received at each of predetermined time points;

an accumulation step: adding, by the accumulation module, 1 to an accumulated numerical value once the first judgment module judges that the predetermined amount of the sensed information is received at a predetermined time point; and a numerical value judgment step: judging, by the second judgment module, whether the accumulated numerical value is equal to a preset value for the barriers after the sensing device moving to the other end of the cartridge from one end of the cartridge, wherein if the second judgment module judges that the accumulated numerical value is equal to the preset value for the barriers, a manipulator will load a substrate into the cartridge; and if the second judgment module judges that the accumulated numerical value is not equal to the preset value for the barriers, the positions of the barriers will be adjusted manually and then the manipulator will load the substrate into the cartridge.

Optionally, the sensing device includes one or more reflective sensors and reflective structures, and the step of sensing the barriers by the sensing device while it is moving from one end of the cartridge to the other end of the cartridge so as to acquire the sensed information includes:

emitting detection signals by the reflective sensors while it is moving from one end of the cartridge to the other end of the cartridge at a predetermined speed;

receiving and reflecting the detection signals by the reflective structures so as to return the reflected signals to the reflective sensors; and generating the sensed information by the reflective sensors at a predetermined time point according to the reflected signals.

Preferably, the first information processing device includes a first judgment module; the position judgment step includes: judging, by the first judgment module, whether the sensed information is received at a predetermined time point, wherein if the first judgment module judges that no sensed information is received at the predetermined time point, then it will send a notification indicating that the corresponding barriers are not located at correct positions.

The present invention provides the cartridge and the detection method for the same, wherein the cartridge can detect whether its loading size is matched with the size of a substrate to be loaded. The sensing device senses the barriers to acquire sensed information and sends the sensed information to the first information processing device, then the first information processing device judges whether the positions of the barriers are correct according to the sensed information, so as to effectively detect whether barriers are located at correct positions. Thereby the damage to the substrate during loading of the substrate is effectively avoided and it is ensured that the substrate can be safely loaded into the cartridge.

DETAILED DESCRIPTION OF THE EMBODIMENTS

To make the person skilled in the art better understand the technical solutions of the present invention, the cartridge and the detection method for the same provided by the present invention will be described below in details with reference to the accompanying drawings.

Embodiment 1

Figure 5:
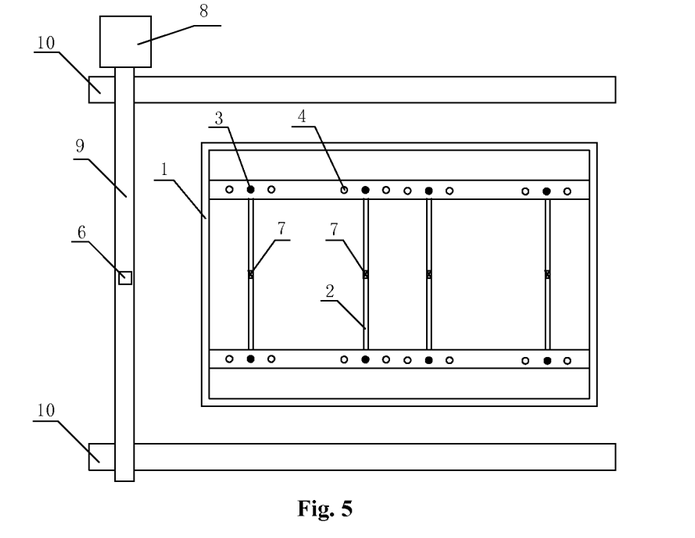
FIG. 5 is a schematic diagram of a cartridge according to Embodiment 1 of the present invention.

FIG. 5 is a schematic diagram of a cartridge according to Embodiment 1 of the present invention. As shown in FIG. 5, the cartridge includes an outer frame 1, barriers 2 located inside the outer frame 1 and a detection device. The detection device includes a sensing device and a first information processing device. The sensing device is configured to sense the barriers 2 to acquire sensed information and send the sensed information to the first information processing device. The first information processing device is configured to judge whether the positions of the barriers 2 are correct according to the sensed information.

In Embodiment 1 of the present invention, the positions of the barriers 2 in the cartridge are detected in order to detect a loading size of the cartridge. Specifically, before loading a substrate, the barriers 2 are sensed by the sensing device to acquire sensed information, and the information processing device judges whether the positions of the barriers 2 are correct according to the sensed information and thus judges whether the loading size defined by the barriers 2 is matched with the size of the substrate to be loaded. In Embodiment 1 of the present invention, a detection device is additionally provided, so that the cartridge provided by the present invention can detect the loading size thereof and thus can adjust the loading size before loading the substrates. Therefore the problem in the process of loading substrates that the size of the substrate is not matched with the loading size of the cartridge is effectively avoided.

Optionally, the sensing device senses the barriers 2 while moving from one end of the cartridge to the other end of the cartridge, in order to acquire sensed information, and sends the sensed information to the first information processing device. The sensing device senses the barriers 2 in a manner of moving from one end of the cartridge to the other end of the cartridge. Such manner not only enables the sensing device to acquire information on the positions of all the barriers 2, but also is easy implemented.

Optionally, the sensing may be performed by reflective elements. In this case, the sensing device includes one or more reflective sensors 6 and reflective structures 7. When in operation, the reflective sensors 6 are configured to emit detection signals while moving from one end of the cartridge to the other end of the cartridge at a predetermined speed. The reflective sensors 6 receive reflected signals returned from the reflective structures 7, then generate sensed information based on the reflected signals, and send the sensed information to the first information processing device. The reflective structures 7 are configured to receive the detection signals and reflect the detection signals to the reflective sensors 6.

Preferably, the reflective sensors 6 are located above the cartridge, while the reflective structures 7 are disposed on top of respective barriers 2. The reflective sensors 6 emit detection signals downward vertically during movement. The moving path of the reflective sensors 6 lies right above the reflective structures 7, that is, the reflective sensors 6 and the reflective structures 7 are in a line alone the moving direction of the reflective sensors. For example, the reflective sensors 6 and the reflective structures 7 are located in a straight line when viewing from the top of the cartridge. In this way, the accuracy of detecting the positions of the barriers 2 may be increased. Therefore, when the reflective sensors 6 move over one of the barriers 2, the emitted detection signals may be reflected by the reflective structures 7 disposed on this barrier 2, so that the reflected signals are returned to the reflective sensors 6. The reflective sensors 6 generate sensed information based on the reflected signals and send the sensed information to the first information processing device. The first information processing device thus determines that there is a barrier 2 under the reflective sensors 6 at this moment. If the reflective sensors 6 fail to receive the reflected signals returned from the reflective structures 7, the reflective sensors 6 do not generate sensed information. Therefore, the first information processing device fails to receive the sensed information and thus may determine that there is no barrier 2 under the reflective sensors 6 at this moment. The reflective structures 7 in Embodiment 1 may be high-reflectivity films.

Preferably, the number of the required barriers 2 and the correct positions thereof may be preset according to the size of substrates to be loaded. As the moving speed of the reflective sensors 6 is a preset constant value, the first information processing device may acquire, based on the preset correct positions of the barriers 2 and the moving speed of the reflective sensors 6, the moments (referred to as predetermined time points hereinafter) at which the reflective sensors 6 should send the sensed information to the first information processing device when the barriers 2 are arranged at the correct positions. If the first information processing device receives the sensed information at the predetermined time point, it indicates that the corresponding barrier 2 has been arranged at the correct position. In this case, no notification may be sent; alternatively, a notification indicating that the corresponding barrier is located at the correct position may be sent. For example, an indicator lamp, such as an LED, may be used for indicating that the arrangement positions of the barriers are correct. On the other hand, if the first information processing device fails to receive the sensed information at the predetermined time point, it indicates that the corresponding barrier 2 is not located at the correct position. In this case, a warning, such as an alarm and so on, may be sent to operators, in order to remind the operators of performing manual check and adjustment on the arrangement of the corresponding barrier 2. In this way, the operators may easily and directly acquire the arrangement condition of the position of each barrier 2 and thus learn which barrier needs to be adjusted.

Preferably, the cartridge may also be structured to provide more functions. For example, the first information processing device may be configured to acquire, based on the sensed information sent by the reflective sensors 6, time points when the reflective sensors 6 receive the reflected signals, and acquire positions (actual positions) of the corresponding barriers 2 according to the time points. By comparing the actual positions with the positions (preset positions) where the barriers 2 should be arranged, an adjustment distance for the barriers 2 can be determined. The first information processing device may be configured to display the barriers 2 to be adjusted and the adjustment distances thereof to operators, or configured to control a driving mechanism electrically connected to the barriers 2 in order to automatically adjust the positions of the barriers 2. In this way, the workload of operators may be relieved, and the working efficiency may be improved.

To describe the technical solutions in Embodiment 1 of the present invention more clearly, in combination with FIG. 3 and FIG. 5, the condition of loading small-size substrates into the cartridge shown in FIG. 3 by using the detection device provided by Embodiment 1 of the present invention will be described. It is assumed that the predetermined moving speed of the reflective sensors 6 is 10 cm/s, the length of the substrate is 30 cm, the length of the cartridge is 80 cm, there are four barriers 2 in the cartridge, and the position of barrier 2 indicates the distance from the leftmost side of the outer frame 1 to the barrier 2. In order to load the substrates, the positions of the four barriers 2 may be set as 5 cm, 35 cm, 45 cm and 75 cm from left to right. Accordingly, the corresponding predetermined time points are 0.5 s, 3.5 s, 4.5 s and 7.5 s, respectively. It should be noted that the positions of the barriers 2 is not limited to those as mentioned above, but may be reasonably set according to practical experience.

At the predetermined time point 0.5 s, the reflective sensors 6 have moved a distance of 5 cm. If the first information processing device receives the sensed information, it is determined that there is a barrier 2 at a position 5 cm way from the leftmost side of the outer frame 1. If the first information processing device fails to receive the sensed information, it is determined that there is no barrier 2 at the position 5 cm way from the leftmost side of the outer frame 1.

As mentioned above, similar determinations are performed on the other three predetermined time points 3.5 s, 4.5 s and 7.5 s. When it is determined that there are barriers 2 at 5 cm, 35 cm, 45 cm and 75 cm, it indicates that the barriers 2 in the cartridge are all located at correct positions, and the loading size of the cartridge is matched with the size of the substrates, so that the loading of the substrate can be performed.

It is to be noted that, the number of barriers in each cartridge may be set according to actual conditions, and the cartridge structure having four barriers in this embodiment is not intended to limit the cartridge structure of the present invention. In the present invention, there may be two or more barriers, and the number of the predetermined time points should be the same as that of the barriers.

In this embodiment, the sensing device includes reflective sensors and reflective structures, wherein the detection signals are emitted by the reflective sensors and the reflected signals are returned from the reflective structures. Such mode is easy to implement and would be low power consumed. Meanwhile, the cost of the reflective sensors and the reflective structures is also low, so that it is ensured that the cartridge provided by the present invention has low cost.

Optionally, the detection device further includes a driving device 8, a suspension beam 9 and two guide rails 10. The two guide rails 10 are located above the cartridge and disposed in parallel. The suspension beam 9 is provided across the two guide rails 10 and being perpendicular thereto. The reflective sensors 6 are disposed on the suspension beam 9. The driving device 8 is configured to drive the suspension beam 9 to move from one end of the cartridge to the other end of the cartridge along the guide rails 10 at a predetermined speed. By driving the reflective sensors 6 to move at the predetermined speed by the driving device 8, the speed of the reflective sensors 6 may be controlled accurately, so that the detection to the positions of the barriers is more accurate. Of course, the driving device may be connected to a Programmable Logic Controller (PLC for short) in the backstage, so that state of the driving device is controlled by the PLC.

Referring to FIG. 5, there is one reflective sensor 6. Accordingly, there is one reflective structure 7 on each of the barriers, and each reflective structure 7 is located in the middle of the top of each barrier. Optionally, the reflective structures 7 may be located in other places other than the middle of the tops of the barriers as long as the reflective structures 7 on the barriers are aligned to the moving path of the reflective sensors 6 so as to facilitate the sensing of the reflective sensor 6.

Optionally, the barriers 2 include stand columns 3 arranged in two lines, positioning holes 4 are formed on the outer frame 1, and the stand columns 3 are disposed in the positioning holes 4 to fix the barriers 2. The reflective structures 7 may be disposed on the tops of the stand columns 3 in any lines.

Optionally, there are more than one reflective sensor 6, and the number of the reflective structures 7 on each barrier 2 is equal to that of the reflective sensors 6. For example, there are two reflective sensors 6, and the reflective structures 7 are disposed on the tops of the stand columns 3 in both lines.

Figure 6:
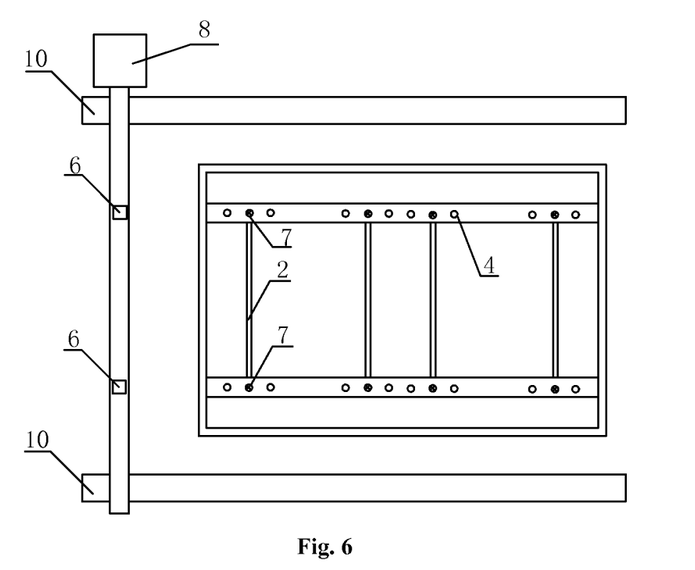
FIG. 6 is a schematic diagram of a cartridge with reflective structures being located on tops of stand columns.

The case where there are two reflective sensors 6 will be described below with reference to FIG. 6. FIG. 6 is a schematic diagram of a cartridge with reflective structures 7 being located on tops of stand columns. In FIG. 6, each of the barriers 2 is fixed by disposing two stand columns 3 into the positioning holes 4, so the positions of the stand columns 3 are corresponding to the positions of the barriers 2. One reflective structure 7 is disposed on each one of the two stand columns 3 corresponding to each barrier 2, so that the reflective structures 7 are arranged in two lines, as shown FIG. 6. In addition, there are also two reflective sensors 6, and each reflective sensor 6 is corresponding to one line of reflective structures 7. It should be noted that, as the reflective structures 7 are disposed on the tops of the stand columns 3, the stand columns 3 located under the reflective structures 7 will not be shown in the top view of FIG. 6. At a predetermined time point, the two reflective sensors 6 receive reflected information reflected by the corresponding reflective structures 7, respectively, so that the two reflective sensors 6 send sensed information to the first information processing device. If the first information processing device receives two pieces of sensed information simultaneously at the predetermined time point, it indicates that the barrier 2 is located at correct position. If the first information processing device fails to receive the sensed information or receives less than two pieces of sensed information at the predetermined time point, it indicates that the barrier 2 is not located at correct position. When there are two reflective structures on each of the barriers 2, the larger the distance between the two reflective structures is, the more accurate the judgment on the position of the barrier 2 is. Specifically, when the two reflective structures 7 are respectively located on two stand columns in each barrier 2, the distance between the reflective structures 7 is the largest, and the judgment on the position of the barrier 2 is the most accurate. When there are more than two reflective structures 7 on each of the barriers 2, preferably, the reflective structures 7 are uniformly distributed on the top of each barrier 2. By providing a plurality of reflective sensors 6, the accuracy of judgment on the positions of the barriers 2 may be effectively improved.

Figure 7:
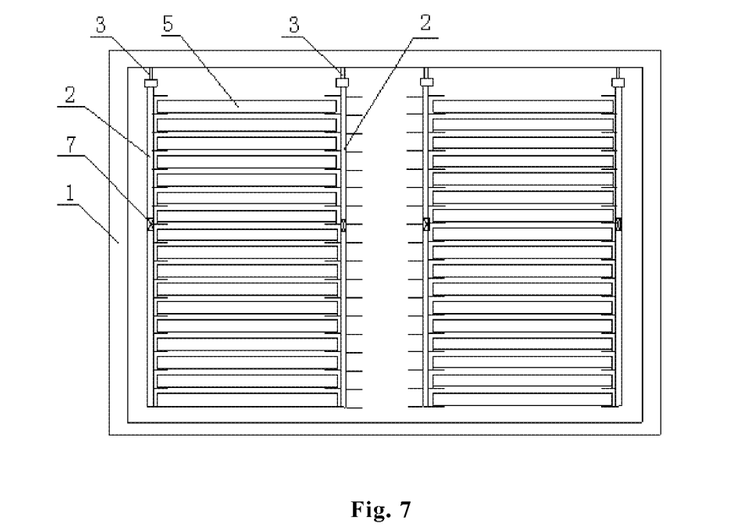
FIG. 7 is a schematic diagram of a cartridge with reflective structures being located on side faces of barriers.

Optionally, the reflective structures may be not disposed on the tops of the barriers 2 and may be instead disposed at other positions of the barriers 2. For example, one reflective structure 7 may be disposed on a same side of the same height of each of the barriers 2, respectively. Specifically, for example, as shown in FIG. 7 which is a schematic diagram of a cartridge with reflective structures being located on one side of the barriers 2 facing the outside of the cartridge. In this case, movable reflective sensors may be disposed on the sides facing the barriers 2. In a specific example, a guide rail (not shown) may be arranged in parallel on the lower inside surface of the cartridge with a certain distance away from the sides of the barriers 2. A vertical strut capable of moving along the guide rail is arranged on the guide rail, and a reflective sensor 6 is provided on the vertical strut at the same height of the reflective structures.

Optionally, the manner of emitting detection signals and receiving reflected signals by the reflective sensors 6 may not be limited to the moving manner. The reflective sensors 6 may be sensor devices fixed at certain positions for emitting detection signals and receiving reflected signals in a manner of rotating within certain angle range. In this case, the first information processing device needs to acquire correct time points of receiving the reflected signals based on the rotation speed and rotation angle of the reflective sensors.

Optionally, the sensing device is not limited to the reflective sensors and may be instead a device for sensing barriers in other ways. For example, a camera may be used for shooting images of the barriers, and the first information processing device may have functions of image extraction and analysis.

Optionally, the first information processing device includes a first judge module, an accumulation module and a second judgment module. The first judgment module is configured to judge whether a predetermined amount of the sensed information is received at each of the predetermined time points. If the predetermined amount of the sensed information is received at one predetermined time point, the accumulation module adds 1 to an accumulated numerical value. The second judgment module is configured to judge whether the accumulated numerical value is equal to a preset value for the barriers 2 after the sensing device moves from one end of the cartridge to the other end of the cartridge, determine that the positions of the barriers 2 are correct if the accumulated numerical value is equal to the preset value for the barriers 2, and determine that the positions of the barriers 2 are not correct if the accumulated numerical value is not equal to the preset value for the barriers 2.

The amount of the sensed information received every time by the first information processing device from the sensing device is preset, that is, the sensing device may be configured to send one or more pieces of sensed information to the first information processing device every time. If the amount of the sensed information received by the first information processing device every time (i.e. at each predetermined time point) is equal to the amount of the preset sensed information, the accumulation module adds 1 to the accumulated numerical value. When the sensing device moves from one end of the cartridge to the other end of the cartridge, whether the accumulated numerical value is equal to the number of the barriers 2 is judged by the second judgment module. The principle is as follows: one piece of sensed information indicates that one barrier 2 is located at its correct position; when all the barriers 2 are located at the correct positions, the sensing device will generate sensed information of an amount equal to the number of the barriers 2, and thus it indicates that the loading size of the cartridge is matched with the size of substrate to be loaded. If the accumulated numerical value is not equal to the number of the barriers 2, it indicates that at least one barrier 2 is not located at its correct position, so that it is required to adjust the position of the barrier 2.

Optionally, the detection device further includes a second information processing device. The second information processing device is configured to compare a predetermined loading size of the cartridge with the size of the substrate. If the result of the comparison shows that the predetermined loading size of the cartridge is matched with the size of the substrate, the sensing device will be activated. If the result of the comparison shows that the predetermined loading size of the cartridge is not matched with the size of the substrate, the loading size of the cartridge will be changed (adjusted) and then the sensing device will be activated.

During the predetermination of information about the loading size of the cartridge, man-made errors may cause the loading size of the cartridge being not matched with the size of the substrate. Therefore, before practically detecting the loading size of a cartridge, whether the predetermined loading size of the cartridge is matched with the size of the substrate is detected, so that the adjustment to the cartridge based on the information about the loading size of the cartridge is guaranteed.

It should be noted that, the detection device in Embodiment 1 of the present invention may be disposed outside the outer frame, as shown in FIG. 5 and FIG. 6; or, the detection device and the outer frame form an integrated structure. In this case, no corresponding drawings are given in Embodiment 1 of the present invention.

In addition, each component or device of the present invention may be implemented by a respective independent functional module, or integrated into one function module. For example, although the first information processing device and a sensor in the sensing device in this embodiment are two separately independent devices, they may be integrated into one device. In other embodiments, the first information processing device may be communicated with the sensing device in a wired or wireless manner. The first information processing device may even be disposed in a place far away from the cartridge, for example, as a mobile device carried by an operator. The first information processing device may have a function of communicating with a remote computer to send on-site data or information to the remote computer so as to store it as historical information for further reference or other subsequent managements.

Embodiment 2

Figure 8:
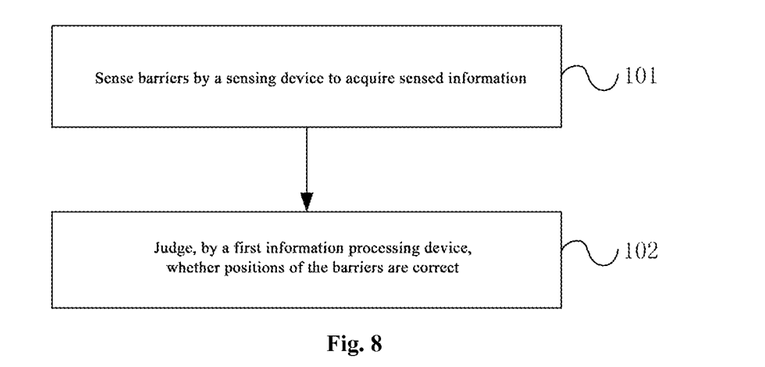
FIG. 8 is a flowchart of a detection method for a cartridge according to Embodiment 2 of the present invention.

FIG. 8 is a flowchart of a detection method for a cartridge according to Embodiment 2 of the present invention. As described above, the cartridge provided by the present invention includes an outer frame, barriers located inside the outer frame and a detection device, wherein the detection device includes a sensing device and a first information processing device. The detection method for a cartridge provided by Embodiment 2 of the present invention is based on the usage of the cartridge. As shown in FIG. 8, the detection method for a cartridge includes:

Step 101: sensing barriers by the sensing device to acquire sensed information.

Step 102: judging, by the first information processing device, whether the positions of the barriers are correct based on the sensed information.

Embodiment 3

Figure 9:
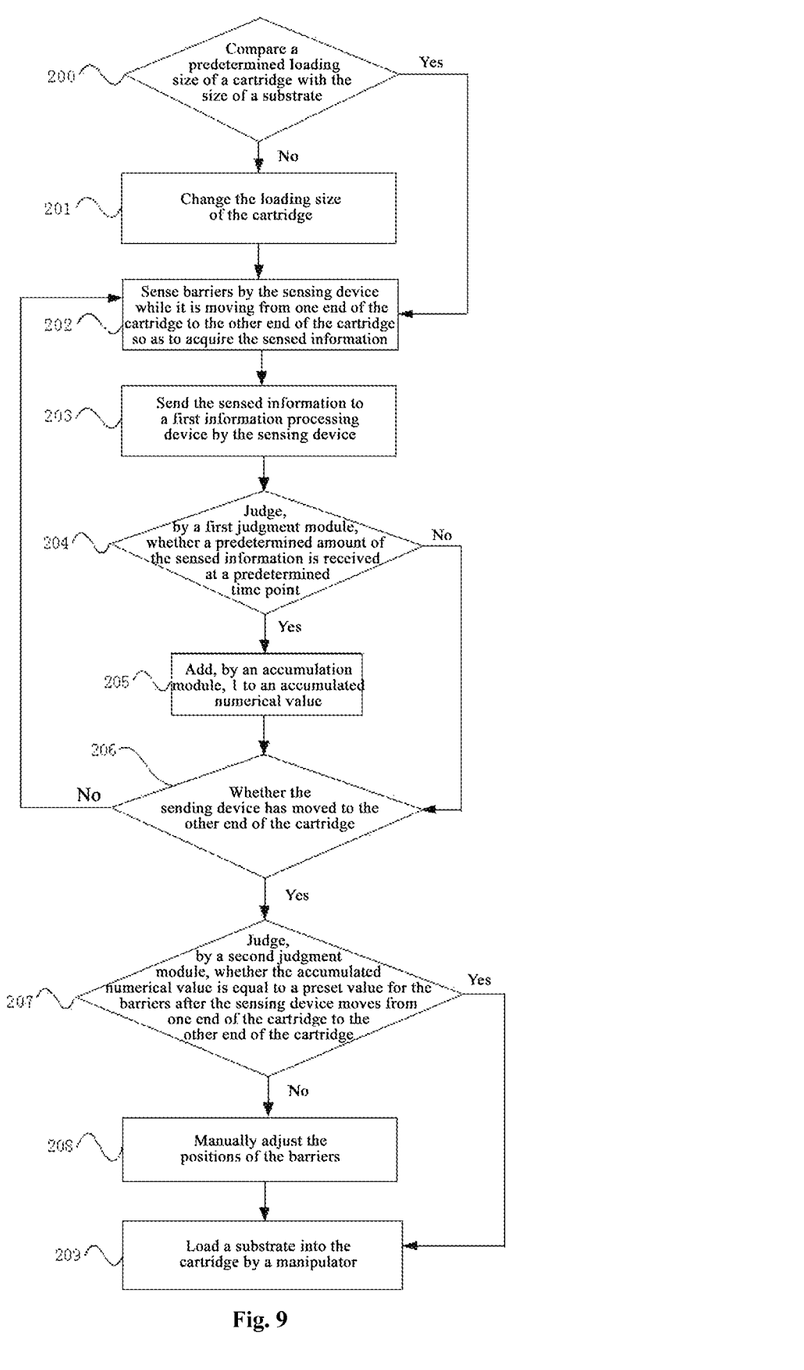
FIG. 9 is a flowchart of a detection method for a cartridge according to Embodiment 3 of the present invention.

FIG. 9 is a flowchart of a detection method for a cartridge according to Embodiment 3 of the present invention. The cartridge provided by the present invention includes an outer frame, barriers located inside the outer frame and a detection device, wherein the detection device includes a sensing device and a first information processing device, and the detection method for a cartridge provided by Embodiment 3 of the present invention is based on the usage of the cartridge. As shown in FIG. 9, the detection method for a cartridge includes:

Step 200: comparing a predetermined locating size of the cartridge with the size of a substrate by a second information processing device; if the result of comparison shows that the predetermined locating size of the cartridge is matched with the size of the substrate (the judgment is "Yes"), performing Step 202; and, if result of comparison shows that the predetermined locating size of the cartridge is not matched with the size of the substrate (the judgment is "No"), performing Step 201.

Step 201: changing the loading size of the cartridge, and continuing to perform Step 202 subsequently.

Step 202: sensing barriers by the sensing device to acquire sensed information.

Step 203: sending the sensed information to the first information processing device by the sensing device.

Step 204: judging, by a first judgment module, whether a predetermined amount of sensed information is received at each of predetermined time points, performing Step 205 if the result of the judgment is "Yes", and performing Step 206 if the result of judgment is "No".

Step 205: adding, by an accumulation module, 1 to an accumulated numerical value.

Step 206: in the case where the sensing device has moved to the other end of the cartridge, sending, by the sensing device, a signal indicating that the sensing device has moved to the other end of the cartridge, to the first information processing device (the judgment is "Yes"), and performing Step 207; otherwise, if the sensing device has not moved to the other end of the cartridge, not sending the above signal to the first information processing device, and returning to Step 202 to continue to repeat Steps 202-206.

Step 207: after the information processing device, according to the above signal sent by the sensing device, learns that the sensing device has moved from one end of the cartridge to the other end of the cartridge, judging, by a second judgment module, whether the accumulated numerical value is equal to the preset value for the barriers; if the second judgment module judges that the accumulated numerical value is equal to the preset value for the barriers (the judgment is "Yes"), performing Step 209; and, if the second judgment module judges that the accumulated numerical value is not equal to the preset value for the barriers (the judgment is "No"), performing Step 208.

Step 208: manually adjusting the positions of the barriers, and performing Step 209 subsequently.

Step 209: loading, a substrate into the cartridge by a manipulator.

Figure 10:
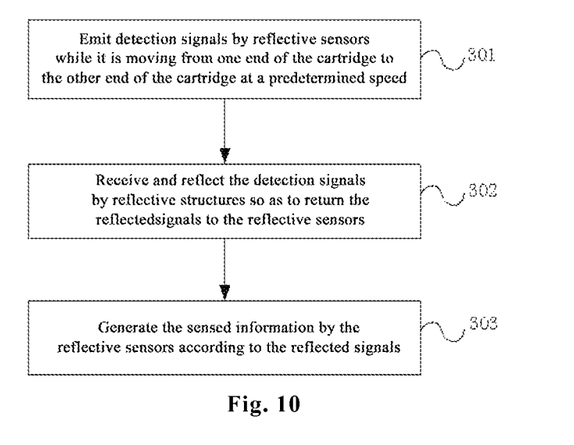
FIG. 10 is a flowchart of a sensing method according to a preferred embodiment of the present invention.

FIG. 10 is a flowchart of a sensing method according to a preferred embodiment of the present invention. As shown in FIG. 10, Step 202 may include:

Step 301: emitting detection signals by reflective sensors while it is moving from one end of the cartridge to the other end of the cartridge at a predetermined speed.

Step 302: receiving and reflecting the detection signals by the reflective structures so as to return the reflected signals to the reflective sensors.

Step 303: generating the sensed information by the reflective sensors according to the reflected signals.

It should be understood that the foregoing embodiments are merely exemplary embodiments used for describing the principle of the present invention, and the present invention is not limited thereto. A person of ordinary skill in the art may make various variations and improvements without departing from the spirit and essence of the present invention, and these deformations and improvements are also interpreted to be within the protection scope of the present invention.

The invention claimed is:

1. A cartridge, comprising an outer frame and barriers located inside the outer frame, characterized in further comprising a detection device, wherein the detection device comprises:

a sensing device, configured to sense the barriers so as to acquire sensed information; and a first information processing device, configured to detect positions of the barriers according to the sensed information and obtain a loading size of the cartridge according to the detected positions of the barriers, the sensing device while moving relative to the barriers from one end of the cartridge to the other end of the cartridge, is configured to emit detection signals towards the barriers, receive reflected signals corresponding to the detection signals, generate the sensed information based on the reflected signals and send the sensed information to the first information processing device, and the first information processing device comprises: a first judgment module, configured to judge whether the sensed information is received at a predetermined time point, and send a notification indicating that the corresponding barriers are not located at correct positions when it is judged that no sensed information is received at the predetermined time point, wherein the predetermined time point is determined based on desired positions of the barriers and a moving speed of the sensing device.

2. The cartridge according to claim 1, wherein the sensing device comprises one or more reflective sensors and reflective structures, the reflective sensors are located above the cartridge and configured to emit detection signals while moving relative to the barriers from one end of the cartridge to the other end of the cartridge at a predetermined speed, generate sensed information when receiving reflected signals returned from the reflective structures, and send the sensed information to the first information processing device;

and the reflective structures are disposed on the tops of the barriers and configured to receive the detection signals and reflect the detection signals to the reflective sensors.

3. The cartridge according to claim 2, wherein the barriers comprise stand columns, positioning holes are formed on the outer frame, the stand columns are fixed in the positioning holes to settle the barriers, and the reflective structures are disposed on the tops of the stand columns, respectively.

4. The cartridge according to claim 2, wherein the reflective sensors and the reflective structures are in a line along the moving direction of the reflective sensors.

5. The cartridge according to claim 2, further comprising a driving device, a suspension beam and two guide rails, the two guide rails being located above the cartridge and disposed in parallel with each other, the suspension beam being provided across and perpendicular to the two guide rails, the reflective sensors being disposed on the suspension beam;
   and the driving device being configured to drive the suspension beam to move from one end of the cartridge to the other end of the cartridge along the guide rails at a predetermined speed.

6. The cartridge according to claim 2, wherein a plurality of reflective sensors are provided, and the number of the reflective structures on each barrier is equal to that of the plurality of reflective sensors.

7. The cartridge according to claim 1, wherein the first information processing device comprises:
   the first judgment module, configured to judge whether a predetermined amount of the sensed information is received at each of predetermined time points;
   an accumulation module, configured to add 1 to an accumulated numerical value once the first judgment module judges that the predetermined amount of the sensed information is received at a predetermined time point; and
   a second judgment module, configured to judge whether the accumulated numerical value is equal to a preset value for the barriers after the sensing device moving relative to the barriers to the other end of the cartridge from one end of the cartridge, wherein if the accumulated numerical value is judged to be equal to the preset value for the barriers, it will determine that the positions of the barriers are correct; and if the accumulated numerical value is judged to be not equal to the preset value for the barriers, it will determine that the positions of the barriers are not correct.

8. The cartridge according to claim 1, further comprising:
   a second information processing device, configured to compare a predetermined loading size of the cartridge with the size of the substrate, wherein if the result of the comparison shows that the predetermined loading size of the cartridge is matched with the size of the substrate, the sensing device will be activated; and
   if the result of the comparison shows that the predetermined loading size of the cartridge is not matched with the size of the substrate, the loading size of the cartridge will be adjusted and then the sensing device will be activated.

9. A detection method for a cartridge, wherein the cartridge comprises an outer frame, barriers located inside the outer frame and a detection device, the detection device comprises a sensing device and a first information processing device, and the detection method is based on the usage of the cartridge, and comprises:
   a sensing step: sensing the barriers by the sensing device to acquire sensed information;
   a position detection step: detecting, by the first information processing device, positions of the barriers based on the sensed information; and
   an obtaining step: obtaining, by the first information processing device, a loading size of the cartridge according to the detected positions of the barriers,
   wherein the sensing step comprises: operating the sensing device to emit detection signals towards the barriers, receive reflected signals corresponding to the detection signals, generate the sensed information based on the reflected signals, and send the sensed information to the first information processing device while the sensing device is moving relative to the barriers from one end of the cartridge to the other end of the cartridge,
   and the first information processing device comprises a first judgment module, and the position judgment step comprises: judging, by the first judgment module, whether the sensed information is received at a predetermined time point, wherein if the first judgment module judges that no sensed information is received at the predetermined time point, it will send a notification indicating that the corresponding barriers are not located at correct positions, wherein the predetermined time point is determined based on desired positions of the barriers and a moving speed of the sensing device.

10. The detection method for a cartridge according to claim 9, wherein the detection device further comprises a second information processing device, and before the sensing step, the detection method further comprises:
    a comparison step: comparing a predetermined loading size of the cartridge with the size of a substrate by the second information processing device, wherein
    if the result of the comparison made by the second information processing device shows that the predetermined loading size of the cartridge is matched with the size of the substrate, the sensing step is performed; and
    if the result of the comparison made by the second information processing device shows that the predetermined loading size of the cartridge is not matched with the size of the substrate, the sensing step is performed after the loading size of the cartridge is adjusted.

11. The detection method for a cartridge according to claim 9, wherein the first information processing device further comprises an accumulation module and a second judgment module, and the position judgment step comprises:
    a time point judgment step: judging, by the first judgment module, whether a predetermined amount of the sensed information is received at each of predetermined time points;
    an accumulation step: adding, by the accumulation module, 1 to an accumulated numerical value once the first judgment module judges that the predetermined amount of the sensed information is received at one of the predetermined time points; and
    a numerical value judgment step: judging, by the second judgment module, whether the accumulated numerical value is equal to a preset value for the barriers after the sensing device moving relative to the barriers to the other end of the cartridge from one end of the cartridge, wherein
    if the second judgment module judges that the accumulated numerical value is equal to the preset value for the barriers, a manipulator will load the substrate into the cartridge; and
    if the second judgment module judges that the accumulated numerical value is not equal to the preset value for the barriers, the positions of the barriers will be adjusted manually and then the manipulator will load the substrate into the cartridge.

12. The detection method for a cartridge according to claim 9, wherein the sensing device comprises one or more reflective sensors and reflective structures, and the step of sensing the barriers by the sensing device while it is moving relative to the barriers from one end of the cartridge to the other end of the cartridge so as to acquire the sensed information comprises:
    emitting detection signals by the reflective sensors while it is moving relative to the barriers from one end of the cartridge to the other end of the cartridge at a predetermined speed;
    receiving and reflecting the detection signals by the reflective structures so as to return the reflected signals to the reflective sensors; and
    generating the sensed information by the reflective sensors at the predetermined time point according to the reflected signals.

\* \* \* \* \*